3,190,912
PROCESS FOR PREPARING ESTERS
Robert E. Robinson, Cincinnati, Ohio, assignor to National Distillers and Chemical Corporation, New York, N.Y., a corporation of Virginia
No Drawing. Filed May 2, 1962, Ser. No. 191,700
12 Claims. (Cl. 260—497)

This invention relates to an improved process for preparing unsaturated organic esters. More particularly, it relates to a novel method for preparing unsaturated esters of organic acids from unsaturated organic compounds.

In recent years there has been an increased demand for unsaturated esters of organic acids in a variety of fields, such as in the preparation of polymers, copolymers, and resins from these polymers. In addition, these esters have been finding increased application in the synthesis of drugs and as chemical intermediates, such as acetylating agents. These increased demands have led to attempts to produce these esters in high yields by economical and efficient processes. Although it is not intended to be limited thereto, for convenience the present process will be discussed and illustrated in terms of vinyl acetate.

The first mention of vinyl acetate was in 1912 when Klatte obtained it as a by-product in the preparation of ethylidene diacetate by the direct combination of acetic acid and acetylene in the presence of a mercury salt. Vinyl acetate is now produced commercially by the reaction of acetylene with acetic acid or by the reaction of acetaldehyde with acetic anhydride. A major disadvantage of these processes is the relatively high cost of the reactants. This shows up to an even greater degree in the the preparation of esters other than vinyl acetate, for example, in the synthesis of propenyl acetate from methyl acetylene.

It is an object of this invention to provide a novel and effective method for the preparation of unsaturated esters from unsaturated organic compounds, substituted and unsubstituted, and organic acids.

Another object of this invention is to prepare unsaturated esters of organic acids by a continuous, catalytic process that overcomes the disadvantages of the processes of the prior art.

It is another object of this invention to produce high yields of vinyl acetate from ethylene by a direct and efficient gas phase process.

Further objects of this invention will become apparent from the following description and embodiments.

In accordance with this invention, an unsaturated organic compound, an organic acid, and oxygen or an oxygen-containing gas are reacted in gas phase and in the presence of a suitable catalyst to form the corresponding ester. The general reaction for preparing unsaturated esters by the process of this invention may be illustrated by the following equation RCH=CHR+R'COOH+½O₂
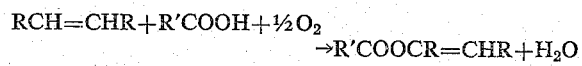
→R'COOCR=CHR+H₂O wherein either or both R's may be hydrogen or a substituted or unsubstituted, branched or straight chain, aliphatic, cycloaliphatic, or aromatic radical having from about 1 to 16 carbon atoms per molecule, the total number of carbon atoms per molecule not exceeding 18. R' may be hydrogen or a substituted or unsubstituted, branched or straight chain, aliphatic, cycloaliphatic, or aromatic radical having from about 1 to 17 carbon atoms per molecule and preferably, because of low vapor pressures, between 1 and 10 carbon atoms per molecule. More particularly, R' can be hydrogen, alkyl, aralkyl, cycloalkyl, aryl, and chloro and carboxy substituted derivatives thereof.

The starting material may be any alkene; typical examples include ethylene, propylene, butene-1, isobutylene, hexene-1, isooctene, triisobutylene, butadiene, styrene, p-chlorostyrene, allylacetate, allyl benzene, ethyl acrylate, octadecene-1, butene-2, pentene-2, pentene-3, hexadiene-1,5, and the like, and mixtures thereof.

The free organic acid R'COOH, containing from 1 to 18 carbon atoms, that reacts with the unsaturated compound RCH=CHR may be formic, acetic, chloroacetic, phenyl acetic, propionic, isobutyric, benzoic, p-toluic, lauric, palmitic, stearic and the like, and mixtures thereof. Dicarboxylic acids such as adipic acid may also be employed.

The catalyst can be any member of the platinum group or the palladium group of metals or an oxide or a salt thereof, either organic or inorganic. Preferably the catalyst is a Group VIII noble metal, salt, or oxide, specific examples of which include palladium, rhodium, platinum, ruthenium, osmium, iridium, palladous benzoate, palladous acetate, palladous propionate, ruthenium acetate, platinous benzoate, rhodium acetate, palladous chloride, palladous oxide, palladous bromide, palladous sulfate, platinum dichloride, platinum oxide, rhodium chloride, rhodium trichloride, rhodium oxide, ruthenium chloride, ruthenium oxide, iridium chloride, and the like, and mixtures thereof. Salts containing the metal (II) valency, and especially palladium (II) metal salts, are preferred. The catalyst may be unsupported or supported on a suitable material, such as carbon, silica, alumina, or the like. The supported catalysts may be obtained commercially or may be prepared by any convenient means, such as by dissolving the metal salt or salts in a suitable solvent, e.g., water, adding the support, e.g., carbon; and evaporating the solvent with heat under vacuum. Only catalytic amounts of catalyst need be employed, and specific amounts may vary from about 0.05 to about 10 percent by weight, based on the total reaction mixture, preferably about 0.2 to about 5 percent by weight.

The activity of the catalyst may, if desired, be promoted by the addition of about 1 to 10 equivalents per equivalent of catalyst of a metal halide promoter. Such promoters are preferably transition metals or transition metal salts, such as for example ferric chloride, ferric bromide, ferric acetate, cupric chloride, cupric acetate, manganese chloride, chromium chloride, cobaltous chloride, sodium chloride, gold chloride, nickel chloride, and the like, or mixtures thereof. The preferred catalysts are rhodium and palladium, either as the free metal, or an oxide or a salt thereof. The preferred promoters are cupric salts and ferric salts.

Neither the reaction temperature nor the reaction pressure is critical. The reaction generally is carried out at a temperature between about 0° and 350° C., preferably between about 50° and 250° C., and at a pressure between about 15 to 1,000 p.s.i., preferably between about 15 and 100 p.s.i. Although theoretically a wider temperature range is possible, and the process of this invention is still operable, at 0° C. the amount of normally liquid reactant that may be retained in gas phase is very small and at temperatures higher than about 350° C. certain undesired by-products are formed.

In a specific embodiment of the present invention, a gaseous stream comprising ethylene, acetic acid, and oxygen is passed over a suitable catalyst; vinyl acetate is recovered from the exhaust gases.

A constant level of acetic acid in the gas stream may be maintained conveniently by saturating the ethylene and oxygen by passing them over liquid acetic acid. It is possible also, if desired, to vaporize the acetic acid separately in a flash chamber and to meter it in as a gas. The exhaust gases are cooled or scrubbed for the recovery of the vinyl acetate. Thus the product vinyl acetate is obtained in solution with excess acetic acid, if any, and this mixture may be separated by any convenient means, e.g., by fractional distillation.

The amount of oxygen, the amount of unsaturated organic compound, and the amount of organic acid may each vary from about 2.5 to about 95 volume percent. The stoichiometric mixture would contain about 20 percent of oxygen in the gas stream, about 40 percent of the unsaturated organic compound, and about 40 percent of organic acid. In preferred embodiments the oxygen content may range from about 5 to about 50 percent, the unsaturated hydrocarbon from about 5 to about 85 percent, and the organic acid from about 5 to 60 percent.

The oxygen required for this process may be used either in pure form or as an oxygen-containing gas such as air. Because of the economics involved, air is the preferred source of oxygen.

In accordance with another feature of this invention, water vapor may be present in the feed stream, resulting in the simultaneous production of unsaturated esters and carbonyl compounds.

The present process for the preparation of organic esters has several advantages over the processes of the art. Carrying out the reaction in gas phase results in a simpler and more efficient operation since no moving parts are required in the apparatus. The separation also is simplified since the product is obtained as a distillate free of extraneous materials except for the reactant organic acid. Further, gas phase reactions generally permit continuous operation and avoid the necessity of expensive solvents.

In addition to being used for the preparation of vinyl acetate, the reaction described herein is applicable to unsaturated compounds or alkenes other than compounds ethylenically unsaturated at the terminal position, such as ethylene, and to other organic acids. For example, butene-2 or styrene may be reacted with acetic acid and oxygen in the presence of a suitable catalyst to yield a mixture of unsaturated acetates corresponding to the starting $RCH=CHR$ compound. Also the acetic acid may be replaced by other organic acids to yield the corresponding unsaturated esters.

The more detailed practice of the present invention is illustrated by the following examples. These examples are illustrative only and are not intended to limit the invention except as indicated by the appended claims.

EXAMPLE I

A length of 8-mm. internal diameter glass tubing was packed with 10 grams of catalyst (0.5% Pd on 4–12 mesh carbon). The tube was heated to 117–119° C. A stream of ethylene (6.8 liters or 278 millimoles per hour) was bubbled through acetic acid at 120° C. to produce a stream of 400–450 millimoles of acetic acid, 278 millimoles of ethylene, and 49 millimoles of oxygen per hour which was passed through the catalyst bed. The exhaust gases were passed through a trap at −78° C. Analysis of the condensate by gas chromatography showed an hourly conversion to vinyl acetate of 0.5 to 0.7 percent, based on the oxygen.

EXAMPLE II

The procedure of Example I was repeated, except that 40 grams of catalyst was used, and the tube had a 16-mm. internal diameter. The conversion rate was 2 to 2.5 percent, based on the oxygen.

EXAMPLE III

The procedure of Example I was repeated, except that the reaction temperature was 210° C. The conversion rate was 2 to 3 percent, based on the oxygen.

EXAMPLE IV

The procedure of Example I was repeated, except that the reaction temperature was 27° C. and the acetic acid content of the gas stream was 15.5 millimoles. The conversion rate was 0.4 to 0.5 percent, based on the acetic acid.

EXAMPLE V

The procedure of Example I was repeated, using a gas stream of 366 millimoles of oxygen, 41 millimoles of ethylene, and 550 millimoles of acetic acid per hour. The conversion rate was 0.4 to 0.5 percent, based on the ethylene.

EXAMPLE VI

The procedure of Example I was repeated, except that the catalyst was 1% Pd on C. The conversion rate was 0.7 to 2 percent, based on the oxygen.

EXAMPLE VII

The procedure of Example I was repeated, except that the catalyst was 1% Pd on $Al_2O_3$. The conversion rate was 0.4 to 3.5 percent, based on the oxygen.

EXAMPLE VIII

The procedure of Example I was repeated, except that the catalyst was 1 millimole of palladous acetate on 10 grams of 6–14 mesh carbon, prepared by dissolving palladous acetate in acetic acid, adding carbon, and then evaporating with heat and vacuum. The conversion rate was 0.5 to 1.7 percent, based on the oxygen.

EXAMPLE IX

The procedure of Example I was repeated, except that the catalyst was 1 millimole of $PdCl_2$ on 10 grams of 6–14 mesh carbon prepared by dissolving the $PdCl_2$ in water, adding the carbon, and then evaporating with heat and vacuum. The conversion rate was 0.2 to 0.5 percent, based on the oxygen.

EXAMPLE X

The procedure of Example I was repeated except that the catalyst was 1 millimole of $PdCl_2$, 2 millimoles of $FeCl_3$, and 6 millimoles of $CuCl_2$ on 10 grams of carbon, prepared by dissolving the salts in water, adding carbon, and then evaporating with heat and vacuum. The conversion rate was 1.5 to 5.0 percent, based on the oxygen.

EXAMPLE XI

The procedure of Example I was repeated, except that the catalyst was 1 millimole of $RhCl_3$ on 10 grams of carbon, prepared by dissolving the salt in water, adding the carbon, and then evaporating with heat and vacuum. The conversion rate was 1.3 to 2.2 percent, based on the oxygen.

EXAMPLE XII

The procedure of Example I was repeated, except that the catalyst was 1 millimole of $PtCl_2$ on 10 grams of carbon, prepared by dissolving the salt in water, adding the carbon, and then evaporating with heat and vacuum. The conversion rate was 0.05 percent, based on the oxygen.

EXAMPLE XIII

The procedure of Example I was repeated, except that the catalyst was 1 millimole of $PdBr_2$ on 10 grams of carbon, prepared by dissolving the salt in water, adding the carbon, and then evaporating with heat and vacuum. The conversion rate was 0.6 to 0.8 percent, based on the oxygen.

EXAMPLE XIV

The procedure of Example I was repeated, except that the catalyst was 1 millimole of $RhCl_3$, 2 millimoles of $FeCl_3$, and 6 millimoles of $CuCl_2$ on 10 grams of carbon, prepared by dissolving the salts in water, adding the carbon, and evaporating with heat and vacuum. The conversion rate was 2 to 5 percent, based on the oxygen.

EXAMPLE XV

The procedure of Example I was repeated, except that the catalyst was 10 grams of 1% platinum on 4–8 mesh carbon. The rate of conversion was 0.23%, based on oxygen.

EXAMPLE XVI

The procedure of Example I was repeated, except that the gas stream consisted of 6.8 liters (278 millimoles) per hour of ethylene, 6.0 liters per hour of air (49 millimoles per hour of oxygen), and 700–750 millimoles per hour of acetic acid. The temperature of the column was held at 100° C. The conversion to vinyl acetate was 0.5%, based on oxygen in the air.

EXAMPLE XVII

A three-necked flask equipped with a mechanical stirrer, a thermometer, and suitable gas connections was charged with 10 grams of 0.5% palladium on carbon of 100 mesh and finer. A gaseous stream consisting of 6.8 liters (278 millimoles) of ethylene and 1.2 liters (49 millimoles) of oxygen per hour was bubbled through acetic acid at 100° C. so as to entrain 400–450 millimoles per hour of acetic acid and then passed through the reaction flask, held at 120° C. The exhaust gases were passed through a trap, and the condensate analyzed for vinyl acetate by vapor phase chromatography. The hourly conversion rate to vinyl acetate was 2%, based on oxygen.

EXAMPLE XVIII

The procedure of Example I was repeated, except that an hourly flow of 6 millimoles of ethylene, 1 millimole of oxygen, and 8 millimoles of acetic acid were employed. The conversion rate to vinyl acetate was 41 percent, based on oxygen.

These examples are summarized in the following table:

*Table*

| Example | Gas stream, millimoles per hour of— | | Acetic acid | Reaction temp., °C. | Catalyst (10 grams unless otherwise noted) | Hourly conversion rate, percent |
| --- | --- | --- | --- | --- | --- | --- |
| | Ethylene | Oxygen | | | | |
| I | 278 | 49 | 400–450 | 120 | 0.5% of Pd on 4–12 mesh carbon. | [1] 0.5–0.7 |
| II | 278 | 49 | 400–450 | 120 | 40 grams 0.5% Pd/C | [1] 2–2.5 |
| III | 278 | 49 | 400–450 | 210 | 0.5% of Pd/C | [1] 2–3 |
| IV | 278 | 49 | 15.5 | 27 | 0.5% of Pd/C | [2] 0.4–0.5 |
| V | 41 | 366 | 550 | 120 | 0.5% of Pd/C | [3] 0.4–0.5 |
| VI | 278 | 49 | 400–450 | 120 | 1% of Pd/C | [1] 0.7–2 |
| VII | 278 | 49 | 400–450 | 120 | 1% of Pd/Al₂O₃ | [1] 0.4–3.5 |
| VIII | 278 | 49 | 400–450 | 120 | 1 millimole of Pd (OAc)₂ on 10 grams of C. | [1] 0.5–1.7 |
| IX | 278 | 49 | 400–450 | 120 | 1 millimole of PdCl₂ on 10 grams of C. | [1] 0.2–0.5 |
| X | 278 | 49 | 400–450 | 120 | 1 millimole of PdCl₂, 2 millimoles of FeCl₃, and 6 millimoles of CuCl₂ on 10 grams of C. | [1] 1.5–5.0 |
| XI | 278 | 49 | 400–450 | 120 | 1 millimole of RhCl₃ on 10 grams of C. | [1] 1.3–2.2 |
| XII | 278 | 49 | 400–450 | 120 | 1 millimole of PtCl₂ | [1] 0.05 |
| XIII | 278 | 49 | 400–450 | 120 | 1 millimole of PdBr₂ on C | [1] 0.6–0.8 |
| XIV | 278 | 49 | 400–450 | 120 | 1 millimole of RhCl₃, 2 millimoles of FeCl₃, 6 millimoles of CuCl₂ on 10 grams of C. | [1] 2–5 |
| XV | 278 | 49 | 400–450 | 120 | 1% of Pt on 4–8 mesh C | [1] 0.23 |
| XVI | 278 | 49 | 700–750 | 100 | 0.5% of Pd on 4–12 mesh C | [1] 0.5 |
| XVII | 278 | 49 | 400–450 | 120 | 0.5% of Pd on C 100 mesh and finer. | [1] 2.0 |
| XVIII | 6 | 1 | 8 | 120 | 0.5% of Pd on 4–12 mesh C | [1] 41 |

[1] Based on oxygen.  [2] Based on acetic acid.  [3] Based on ethylene.

EXAMPLE XIX

The procedure of Example I was repeated, except that the temperature of the catalyst bed was 100° C. and 278 millimoles per hour of high purity trans-2-butene was substituted for the ethylene. Analysis of a condensate of the exhaust material by vapor phase chromatography indicated the presence of butenyl acetate.

While there are above disclosed but a limited number of embodiments of the invention herein presented, it is possible to produce still other embodiments without departing from the inventive concept herein disclosed.

What is claimed is:

1. A vapor phase process for the preparation of unsaturated esters which comprises passing a substantially anhydrous gas mixture consisting essentially of an unsaturated organic compound selected from the group consisting of alkenes, butadiene, styrene, p-chlorostyrene, allyl acetate, allyl benzene, ethyl acrylate and hexadiene-1,5, an organic carboxylic acid having the formula R'COOH, wherein R' is selected from the group consisting of hydrogen, alkyl, aralkyl, cycloalkyl, aryl and chloro and carboxy substituted derivatives thereof, having from 1 to 17 carbon atoms per molecule, and oxygen over a solid catalyst selected from the group consisting of Group VIII noble metals, oxides and salts thereof.

2. The process of claim 1 wherein said unsaturated organic compound is an alkene.

3. The process of claim 2 wherein said alkene is ethylene.

4. The process of claim 1 wherein said catalyst is a palladium metal-containing catalyst.

5. The process of claim 1 wherein said catalyst is a platinum metal-containing catalyst.

6. A vapor phase process for the preparation of vinyl acetate which comprises passing a substantially anhydrous gas mixture consisting essentially of ethylene, acetic acid and oxygen over a solid catalyst selected from the group consisting of Group VIII noble metals, oxides and salts thereof.

7. The process of claim 6 wherein said catalyst is palladium.

8. The process of claim 7 wherein said catalyst is palladous acetate.

9. The process of claim 6 wherein said catalyst is palladous chloride.

10. The process of claim 6 wherein said catalyst is platinum.

11. The process of claim 6 wherein said catalyst is rhodium trichloride.

12. A vapor phase process for the preparation of vinyl acetate which comprises passing a substantially anhydrous gas mixture consisting essentially of ethylene, acetic acid and oxygen over a catalytic amount of solid palladium metal catalyst at a temperature within the range of about 0° to 350° C. and a pressure within the range of about 15 to 1000 p.s.i., recovering a gaseous reaction product mixture containing vinyl acetate, and separating vinyl acetate therefrom.

References Cited by the Examiner
UNITED STATES PATENTS

| | | | |
|---|---|---|---|
| 2,598,263 | 5/52 | Johnson et al. | 260—497 |
| 2,739,169 | 3/56 | Hagemeyer | 260—497 |

FOREIGN PATENTS 137,511  4/60  Russia.

OTHER REFERENCES

Moiseev et al., Doklady Akad. Nauk, S.S.S.R., vol. 133, pages 377 to 380 (1960).

Smidt, Chemistry and Industry, Jan. 13, 1962, pp. 54–61.

Smidt, Angew. Chim., vol. 71, pp. 176–182.

LORRAINE A. WEINBERGER, *Primary Examiner.*

ABRAHAM H. WINKELSTEIN, LEON ZITVER,
*Examiners.*

UNITED STATES PATENT OFFICE
CERTIFICATE OF CORRECTION

Patent No. 3,190,912                            June 22, 1965

Robert E. Robinson

It is certified that error appears in the above identified patent and that said Letters Patent are hereby corrected as shown below:

Column 6, line 32, the claim reference numeral "7" should read -- 6 --.

Signed and sealed this 7th day of October 1969.

(SEAL)
Attest:

Edward M. Fletcher, Jr.                      WILLIAM E. SCHUYLER, JR.
Attesting Officer                              Commissioner of Patents